United States Patent
Egeberg et al.

(10) Patent No.: US 8,912,375 B2
(45) Date of Patent: Dec. 16, 2014

(54) HYDROCONVERSION PROCESS AND CATALYST

(75) Inventors: Rasmus Gottschalck Egeberg, Fredensborg (DK); Kim Grøn Knudsen, Hellerup (DK); Niels Jørgen Blom, Hillerød (DK); Jens A. Hansen, Holte (DK)

(73) Assignee: Haldor Topsoe A/S, Lyngby (DK)

( * ) Notice: Subject to any disclaimer, the term of this patent is extended or adjusted under 35 U.S.C. 154(b) by 952 days.

(21) Appl. No.: 13/063,107

(22) PCT Filed: Jul. 23, 2009

(86) PCT No.: PCT/EP2009/005346
§ 371 (c)(1),
(2), (4) Date: Mar. 9, 2011

(87) PCT Pub. No.: WO2010/028717
PCT Pub. Date: Mar. 18, 2010

(65) Prior Publication Data
US 2011/0166396 A1 Jul. 7, 2011

(30) Foreign Application Priority Data
Sep. 10, 2008 (DK) .................. 2008 01267

(51) Int. Cl.
*C07C 1/00* (2006.01)
*B01J 21/00* (2006.01)
*C10L 1/04* (2006.01)
*C10G 45/02* (2006.01)
*C10G 45/58* (2006.01)
*C10G 65/04* (2006.01)
*C11C 3/00* (2006.01)
*C10G 3/00* (2006.01)

(52) U.S. Cl.
CPC . *C10L 1/04* (2013.01); *C10G 45/02* (2013.01); *C10G 45/58* (2013.01); *C10G 65/043* (2013.01); *C11C 3/00* (2013.01); *C10G 3/44* (2013.01); *C10G 3/48* (2013.01); *C10G 3/50* (2013.01); *Y02E 50/13* (2013.01); *C10G 2300/1014* (2013.01); *C10G 2300/1018* (2013.01); *C10G 2300/4081* (2013.01); *C10G 2300/4018* (2013.01); *C10G 2300/207* (2013.01); *C10G 2400/02* (2013.01); *C10G 2400/04* (2013.01)

USPC .............. 585/240; 585/242; 44/605; 44/606; 502/255

(58) Field of Classification Search
CPC .............. C10L 5/40; C10L 5/44; C10L 9/04; C10G 3/42; C10G 3/46; C10G 3/50; C10G 45/04; C10G 45/08; C10G 47/10; C10G 2300/1011; C10G 2300/1018; C10G 2300/1048; C10G 2400/04
USPC .............. 585/240, 242; 44/605, 606; 502/255
See application file for complete search history.

(56) References Cited

U.S. PATENT DOCUMENTS

| | | | |
|---|---|---|---|
| 4,225,421 A | 9/1980 | Hensley, Jr. et al. | |
| 4,294,685 A | 10/1981 | Kim et al. | |
| 4,526,675 A * | 7/1985 | Mahoney et al. | 208/106 |
| 4,552,650 A * | 11/1985 | Toulhoat et al. | 208/216 PP |
| 4,992,605 A | 2/1991 | Craig et al. | |
| 6,919,294 B2 | 7/2005 | Saito et al. | |
| 8,142,527 B2 * | 3/2012 | Herskowitz et al. | 44/605 |
| 8,258,074 B2 * | 9/2012 | Romero et al. | 502/313 |
| 8,435,912 B2 * | 5/2013 | Chaumonnot et al. | 502/158 |
| 2004/0126315 A1 | 7/2004 | Saito et al. | |
| 2004/0230085 A1 | 11/2004 | Jakkula et al. | |
| 2006/0186020 A1 * | 8/2006 | Gomes | 208/46 |
| 2008/0161614 A1 * | 7/2008 | Bertoncini et al. | 585/240 |
| 2009/0166256 A1 * | 7/2009 | Lewis et al. | 208/89 |
| 2009/0193709 A1 * | 8/2009 | Marker et al. | 44/308 |

FOREIGN PATENT DOCUMENTS

| | | |
|---|---|---|
| CN | 101029245 A | 9/2007 |
| EP | 1 741 767 A1 | 1/2007 |
| WO | WO 02/32570 A2 | 4/2002 |
| WO | WO 2007/141293 A1 | 12/2007 |

* cited by examiner

*Primary Examiner* — Nina Bhat
(74) *Attorney, Agent, or Firm* — Dickstein Shapiro LLP

(57) ABSTRACT

A process and hydrodeoxygenation catalyst for producing high-quality diesel and naphtha fuels from a feedstock that contains oxygen containing components derived from renewable organic material in which the hydrodeoxygenation catalyst is a supported Mo catalyst and in which the support has a bimodal porous structure. The hydrodeoxygenation catalyst has a Mo content of 0.1 to 20 wt %. The support is alumina, silica, titania or combinations thereof, and the support has a bimodal porous structure with pores with a diameter larger than 50 nm that constitute at least 2 vol % of the total pore volume.

13 Claims, No Drawings

HYDROCONVERSION PROCESS AND CATALYST

This application is a national stage entry of PCT/EP2009/005346, filed on Jul. 23, 2009.

This invention relates to a catalytic conversion process involving the use of hydrogen, hydrocarbons, particularly renewable organic materials such as vegetable and animal oils and components derived therefrom. More particularly, the invention is related to a process and hydrodeoxygenation catalyst for producing high-quality diesel and naphtha fuels from a feedstock that contains oxygen containing components derived from renewable organic material. The invention relates also to the use of a supported Mo catalyst in which the support has a bimodal porous structure.

Hydrotreating of hydrocarbons at the refinery allows large scale transformation of crude oil fractions and intermediary refinery stream into clean transportation fuels meeting regulatory specifications. The hydrotreating process removes sulfur and nitrogen by reaction with hydrogen and can also change the structure of petroleum hydrocarbons e.g. by hydrocracking reactions.

Renewable organic material is an alternative source of energy that can supplement fossil fuels. Vegetable oils and animal fats consist mainly (typically >95 wt %) of triglycerides, having the following general formula:

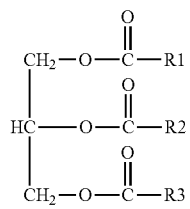

The groups R1, R2 and R3 are aliphatic chains, which typically contain 7-24 carbon atoms and 0-3 double bonds. The oils may also contain a fraction of free fatty acids with similar chain lengths and degree of unsaturation. If crude tall oil or tall oil derived material is used then the feedstock can also contain resin acids. Fatty acid esters (e.g. obtained by transesterification of triglycerides with an alcohol), in particular fatty acid methyl esters (biodiesel) and other oxygen-containing material derived from renewable organic material can also be used as a feedstock, and processed similar to raw vegetable oils and animal fats.

In order to use feedstocks derived from renewable organic material in conventional automobile engines it is desirable to convert the material into hydrocarbons that are similar to those present in fossil derived transportation fuels. It has already for a number of years been known how to convert vegetable oils into normal paraffins in the gasoline or diesel boiling range by employing a hydrotreating process. In this process the renewable organic material is reacted with hydrogen at elevated temperature and pressure in a catalytic reactor.

In the thesis "HYDRCRAQUAGE DE L'HUILE DE SOJA SUR DES CATALYSEURS AU RHODIUM ET AU RUTHENIUM SUPPORTES" by P.P. Nunes, Université Pierre et Marie Curie, Paris, 1984, the reaction of soy oil with hydrogen over silica- and alumina-supported catalysts is described. The triglycerides of soy oil were observed to decompose into fatty acids, and subsequently the fatty acids would either be hydrocracked (as evidenced by the formation of light hydrocarbons), decarboxylated (as evidenced by the formation of n-$C_{15}$, n-$C_{17}$, CO and $CO_2$) or hydrogenolysed (as evidenced by the formation of $H_2O$ and n-$C_{18}$) or a combination hereof. The yield of high-boiling components was greatly enhanced when using a catalyst impregnated with a hydrogenating function, compared to a strictly thermal process or compared to a process employing a silica-alumina catalyst with no impregnated metals. The hydrocracking reactions convert the higher hydrocarbons into gasoline and gas, thereby lowering the diesel yield of the process.

In an article by J. Gusmão and co-workers (Cat. Today, 5 (1989) 533-544) the conversion of vegetable oil over a traditional sulfided Ni—Mo/alumina hydrotreating catalyst is described. At a pressure of 200 bar, the conversion of soy oil into hydrocarbons was reported to initiate at 300° C. and be complete at 360° C. The normal alkanes n-$C_{15}$, n-$C_{16}$, n-$C_{17}$, and n-$C_{18}$ constituted 96 mol % of the products and were formed by a combination of decarbonylation, decarboxylation and hydrogenation. Isomerization and hydrogenolysis was not observed.

U.S. Pat. No. 4,225,421 and WO-A-02/32570 describe the use of molybdenum catalysts supported on bimodal alumina for hydrodemetallation and hydrodesulfurisation of heavy hydrocarbons. U.S. Pat. No. 4,294,685 describes the use of a molybdenum catalyst supported on bimodal alumina for the hydroconversion of coal solids in solvent (coal liquefaction).

U.S. Pat. No. 5,705,722 teaches the use of a hydroprocessing catalyst to convert a tall oil feedstock into a mixture of compounds, some of which can be used as diesel fuel additives. The process takes place at temperatures above 350° C. Similarly, U.S. Pat. No. 4,992,605 describes the conversion of canola oil, sunflower oil, soybean oil, rapeseed oil, palm oil and fatty acid fraction of tall oil into mainly $C_{15}$-$C_{18}$ hydrocarbons using a hydroprocessing catalyst at 350-450° C. The high temperatures applied in these processes cause conversion of diesel-range material into naphtha.

Patent Application FI 960525 describes a two step process where vegetable oil is converted to middle distillates that can be used as a diesel fuel. The feed is first hydrogenated to yield normal paraffins in a hydrotreating step using a conventional hydroprocessing Ni—Mo or Co—Mo catalyst and in the second step is isomerized to branched paraffins by the use of a supported group VIII element catalyst.

U.S. Patent application 2004/0230085 A1 describes a two step process comprising a hydrodeoxygenation (HDO) step and an isomerization step, the latter being operated such that hydrogen and liquid feed are contacted by using a counter-current flow principle. HDO catalysts include Pd, Pt, Ni, NiMo or CoMo catalysts, the support being alumina and/or silica.

The prior art suffers from a lack of reaction control in the top part of the hydroprocessing reactor. As the reaction of vegetable and/or animal oils with hydrogen is a highly exothermic process that consumes high amounts of hydrogen, the temperature can rise very rapidly in the top of the reactor and the hydrogen partial pressure may be very low at the active reaction sites on the catalyst. These conditions will lead to coke formation, plugging up the catalyst and cause a high pressure drop as well as to increased deactivation rate of the catalyst.

Hence, it is an object of the invention to provide an improved process and catalyst that enables the user to convert the components derived from renewable organic material in the feedstock into hydrocarbons in the diesel boiling range with low pressure drop and with a low catalyst deactivation rate.

It is another object of the invention to develop a process that allows for a gradual conversion of the vegetable and/or animal oils, thereby extending the effective reaction zone and suppressing the formation of carbonaceous deposits on the catalyst.

It is a further object of the invention to be able to use a catalyst that is effective in converting the oxygenates in the feed into hydrocarbons in the diesel boiling range, said catalyst being more resistant than the prior art catalysts to the deposition of carbonaceous materials within the catalyst.

Surprisingly, it has been found that an unpromoted catalyst being impregnated only with Mo (and not Co or Ni) is effective in converting vegetable oils, animal fats, fatty acids and fatty acid methyl esters into normal paraffins. As this catalyst turns out to have a somewhat lower activity than traditional Ni—Mo or Co—Mo catalysts, the temperature increase and hydrogen partial pressure reduction due to the hydrogenation reactions take place in a larger section of the reactor, thereby minimizing the potential for forming coke and other deposits that damage catalyst activity and cause increased pressure drop. By using a carrier with a bimodal pore distribution the catalyst employed in the process is more resistant to pore plugging and minimizes increases in pressure drop and deactivation rate.

Accordingly, we provide a process for production of a hydrocarbon fuel from renewable organic material of biological origin comprising the steps:
(a) forming a feedstock by combining a fossil hydrocarbon fuel with a renewable organic material wherein the content of renewable organic material is 1 to 35 vol %;
(b) mixing the feedstock of step (a) with a hydrogen-rich gas and conducting the combined stream to a hydrodeoxygenation stage by contacting said combined stream with a hydrodeoxygenation catalyst, wherein the hydrodeoxygenation catalyst is a supported Mo catalyst having Mo content of 0.1 to 20 wt %, the support being selected from alumina, silica, titania, and combinations thereof, and said support having a bimodal porous structure with pores with a diameter larger than 50 nm that constitute at least 2 vol % of the total pore volume.

The content of Mo in the catalyst is defined on a dry weight basis.

The hydrogen-rich gas is preferably a hydrogen-recycle gas stream, a hydrogen make-up gas or a combination of both.

As used herein the term "renewable organic material" is used interchangeably with the term "renewable organic material of biological origin" and defines vegetable oils, animal fats, tall oil, and derived material such as fatty acid alkyl esters, particularly fatty acid methyl esters (FAME)—also known as biodiesel—, or combinations thereof. All of these represent renewable sources. Vegetable oils include rapeseed, soybean, corn, coconut, palm and cotton oils. Animal fats include bacon grease, yellow grease, lard, butter and tallow.

As used herein hydrodeoxygenation (HDO) means the removal of oxygen of the fossil hydrocarbon fuel and/or renewable organic material by means of hydrogen, i.e. fuel or bio-fuel hydrogenation.

As used herein, hydroprocessing includes oil refinery processes which require the presence of hydrogen, such as hydrodeoxygenation (HDO), hydroisomerisation, hydrodearomatisation (HDA) and hydrotreatment such as in particular hydrodesulfurisation (HDS) and hydrodenitrification (HDN).

Thus, a gas containing hydrogen and the liquid feedstock that consists of vegetable and/or animal oils mixed with a fossil-derived hydrocarbon component is passed to a reactor with one or more hydrodeoxygenation (HDO) catalyst beds.

The hydrodeoxygenation step (b) is carried out at a hydrogen pressure of 1-200 bars and at a temperature of 50-350° C., and at a liquid hourly space velocity of 0.1-10 $h^{-1}$. In this HDO step the pressure may preferably vary between 10 and 150 bars, more preferably between 20 and 100 bars and the inlet temperature varies between 200 and 350° C., preferably between 250 and 350° C. The conversion of biological material to hydrocarbons in this step is above 50%, preferably above 70%. The $H_2$/oil ratio is preferably in the range 200-300 250 $Nm^3/m^3$.

The catalyst employed in the hydrodeoxygenation (HDO) step of the process has a support (carrier) with a bimodal pore distribution, i.e. having both pores with diameter below 50 nm and pores with diameter above 50 nm, as measured by mercury intrusion porosimetry. The pore volume constituted by pores with a diameter above 50 nm (macropores) should constitute at least 2% of the total pore volume, preferably at least 10%, more preferably at least 15%.

Without being bound to any specific theory, it is conjectured that the existence of macropores, which as used herein comprise pores with pore diameters larger than 50 nm, ensures that the carbonaceous deposits and coke precursors that may form during the conversion of biological material can diffuse out of the catalyst pellets and do not cause immediate plugging of the pores. The diffusion of reacting molecules through the catalyst pellet may also proceed through these large pores even in the case of moderate coke formation. On the other hand, the existence of mesopores, which as used herein comprise pores with pore diameters smaller than 50 nm ensures a reasonably high surface area and high metal dispersion.

Preferably, the content of renewable organic material in the feedstock is 10 to 30 vol %, more preferably 15 vol %, for instance 15 vol % rapeseed oil mixed with 85 vol % fossil LGO; or 25 vol %, for instance 25 vol % FAME (biodiesel) and 75 vol % LGO.

The metal component of said HDO-catalyst is molybdenum only. The catalyst with only Mo has low activity for hydrodesulfurisation yet unexpectedly it is still active for bio-fuel HDO (bio-fuel hydrogenation). The content of Mo is between 0.1 and 20 wt %, preferably between 0.1 and 10 wt %, with alumina as the preferred support material. In comparison to promoted hydrotreating catalysts in their active sulfided phase (e.g. Ni—Mo—S or Co—Mo—S) the activity of Mo in its sulfided state ($MoS_2$) for most hydrogenation reactions is quite low.

For conventional hydrotreating processes, a low catalytic activity is not desired since larger reactor volumes are needed to obtain the required degree of e.g. desulfurization. In the present invention and contrary to conventional thinking a low catalytic activity is pursued while we still are able to obtain the same conversion of biological material into hydrocarbon. High hydrogenation activity can result in very high hydrogen consumption and a very high temperature increase over a small fraction of the active catalyst in the top of the reactor. This can lead to rapid catalyst deactivation and a permanently higher pressure drop over the catalyst bed, which may force a premature shutdown of the unit in order to replace the catalyst.

By using a less active catalyst but still obtaining the same conversion of biological material into hydrocarbon, the same amount of hydrogen is consumed in this reaction and the same absolute temperature rise will be seen. However, the conversion will occur over a larger reactor volume so that the place where the local hydrogen partial pressure is low is not the same as the place where the local hydrogen consumption is high. Thereby, the potential formation of coke particles that inhibit catalyst activity and can cause pressure drop is minimized. The larger reaction volume used also allows for at better temperature control e.g. by quenching with cold hydrogen gas before the combined liquid and gas enters the second bed of the reactor. Furthermore, the low catalyst activity means that less hydrogen will be consumed in the event of e.g. hydrodearomatization and hydrodesulfurization reactions compared to a traditional high-activity hydrotreating catalyst again giving a higher hydrogen partial pressure that will inhibit coke formation.

Although the HDO reaction resembles HDS since in both reactions a heteroatom is hydrogenated and taken out of the molecule, the HDO catalyst of the invention only containing Mo is unexpectedly active in the conversion of triglycerides despite being inactive in e.g. HDS, HDN.

A number of procedures may be employed for preparing the alumina support. The large pores can be retained by only adding no or only a small amount of acid to the alumina paste or by decreasing the effective residence time in the mixing device. Large pores can also be formed by other techniques known to those skilled in the art, such as by grinding the alumina and then binding the particles together into spheres or extrudates. Other techniques could be to employ pore growth promoters e.g. by heating the material in the presence of a gas or metal compound, steaming at elevated temperatures or the like. In another preparation method, the large pores may be formed during preparation of the alumina by the use of a strong acid for leaching. Still another procedure would be to introduce into the alumina structure, a material which can later be removed to form the large pores.

Since the Mo catalyst employed in the HDO-step of the process has a rather low desulfurization activity it may be necessary to hydrotreat the effluent in a second step using a conventional hydrotreating catalyst in order to obtain a product that meets specifications for diesel fuels. It may also be necessary to convert the remaining biological material to hydrocarbons in this step. Accordingly the process of the invention may further comprise a step (c): passing the effluent stream from step (b) to a hydrotreating stage by contacting said stream with a hydrotreating catalyst.

This objective can be reached by a conventional hydrotreating step that normally involves operation at temperatures between 200 and 500° C. and pressures up to 200 bars. The $H_2$/oil ratio is preferably in the range 200-300 250 $Nm^3/m^3$. The hydrotreating catalyst of step (c) comprises a metal component selected from Group VIII and/or VI of the Periodic System and being supported on a carrier containing alumina, silica, titania or combinations thereof. These catalysts are preferably those employed conventionally, such as mixed cobalt and/or nickel and molybdenum sulfides (Co—Mo, Ni—Mo, Ni—W) supported on alumina, silica, silica-alumina or combinations of these. Most preferably the hydrotreating catalyst is Ni—Mo/alumina, Co—Mo/alumina or Ni—W/alumina.

The renewable organic material is preferably selected from triglycerides, fatty acids, resin acids, fatty acid esters or combinations thereof.

In an third part of the process, a hydroisomerization catalyst may be included to improve the cold flow properties of the liquid product. Since the hydrogenation of vegetable and/or animal oil mainly results in normal paraffins that have poor cold flow properties it may be necessary to decrease e.g. the cloud or pour point in order to meet regulatory specifications. Accordingly, the process of the invention may further comprise a step (d): passing the effluent stream from step (b) or (c) to a hydroisomerization stage by contacting said stream with a hydroisomerization catalyst.

Thus, according to the invention the hydrotreating step (c) may be omitted and the effluent from the hydrodeoxygenation step (b) is simply passed without hydrotreatment to the hydroisomerization step (d). We have found that it is possible to substantially lower the cloud and pour points of hydrodeoxygenated product even when processing such a high-sulfur feed, meaning that the catalyst of the present invention is also active when used for cold flow improvement in an $H_2S$ atmosphere.

The hydroisomerization step is preferably carried out by mixing the liquid effluent from the first step (hydrodeoxygenation) or second step (hydrotreating) of the process with a hydrogen rich gas and contacting the mixed stream with a hydroisomerization catalyst. More preferably, the hydroisomerization step is carried out by contacting the liquid product obtained from step a) or from step b) concurrently with a hydrogen-containing gas stream over the hydroisomerization catalyst.

In yet another embodiment the process further comprises separating the effluent from any of the steps (b), (c) and (d) into a liquid effluent stream and a gaseous effluent stream, mixing said liquid effluent stream with a fresh hydrogen-rich gas, forming a purified hydrogen containing gas stream by removing $H_2S$, $NH_3$, CO, $CO_2$ and light hydrocarbons from said gaseous effluent, and recycling said purified hydrogen containing gas to any of the steps (b), (c) and (d).

The hydroisomerization treating catalyst of step (d) comprises a metal component selected from Group VIII and/or VI of the Periodic System and being supported on a carrier containing alumina, silica, titania, silica-alumina, ZSM-5, zeolite beta or combinations thereof. Preferably the hydroisomerization catalyst is Ni—W supported on a carrier containing alumina, zeolite beta and silica-alumina.

This step may be carried out in the same reactor and/or same catalyst bed as the previous step(s) or it may be carried out in a separate reactor, as defined in sub-claim 9. In a particular embodiment steps (b), (c) are carried out in the same hydroprocessing reactor with step (b) being conducted in the top 20 vol % of the catalyst bed and step (c) in the bottom 80 vol % of the catalyst bed. The catalyst bed is therefore a combination of catalysts active in hydrodeoxygenation (HDO) and hydrotreatment (HDS, HDN).

The hydroisomerization step involves operation between 200 and 500° C. at pressures up to 200 bars. In a particular embodiment, the hydrodetreating step (c) and hydroisomerization step (d) are carried out at a hydrogen pressure of 1-200 bar and at a temperature of 50-450° C., preferably at a pressure of 10-150 bar and a temperature of 250-410° C. and at a liquid hourly space velocity of 0.1-10 $h^{-1}$. The $H_2$/oil ratio is preferably in the range 200-300 250 $Nm^3/m^3$.

The hydroisomerization catalyst converts the normal paraffins (created in the hydrogenation of the components derived from renewable organic material in the feedstock) into iso-paraffins with better cold-flow properties. The bifunctional hydroisomerization catalyst contains both acidic sites typically associated with the oxide carrier and hydrogenation sites typically associated with the metal component. If the active metal component is one or more Group VIII noble metals, the hydroisomerization should preferably be carried out in a separate reactor or catalyst bed and the feed to the hydroisomerization catalyst should be virtually free of nitrogen and sulfur species, i.e. contain less than 100 wtppm sulfur and less than 100 wtppm nitrogen, preferably less than 10 wtppm sulfur and less than 10 wtppm nitrogen. If the active phase of the metal components is a metal sulfide (e.g. Ni—Mo—S, Co—Mo—S, Ni—W—S) then the step may be carried out in a sour environment and the costly installment of equipment to remove $H_2S$ and $NH_3$ formed in the previous step(s) is thus not necessary.

The invention encompasses also as defined in claim 13 the use of a hydrodeoxygenation catalyst in the form of a supported Mo catalyst having Mo content of 0.1 to 20 wt %, the support being selected from alumina, silica, titania, and combinations thereof, and said support having a bimodal porous structure with pores with a diameter larger than 50 nm that constitute at least 2 vol % of the total pore volume, as hydrodeoxygenation (HDO) catalyst for the treatment of feedstocks combining a fossil hydrocarbon fuel with a renewable organic material wherein the content of renewable organic material material is 1 to 35 vol %.

Preferably, the content of renewable organic material in the feedstock is 10 to 30 vol %, more preferably 15 vol %, for instance 15 vol % rapeseed oil mixed with 85 vol % fossil LGO; or 25 vol %, for instance 25 vol % FAME (biodiesel) and 75 vol % LGO.

The pore volume constituted by pores with a diameter above 50 nm (macropores) is preferably at least 10% of the total pore volume, more preferably at least 15%.

EXAMPLE 1

1000 g of amorphous alumina powder is mixed with 850 g water for 10 minutes and extruded in 1/16" trilobe shape. The extrudates are dried and calcined for 2 hours at 600° C. The carrier is impregnated with a basic solution of ammoniumdimolybdate (ADM), dried, and calcined at 400° C. for 2 hours. The amount of ADM is adjusted to produce a catalyst with 3 wt % Mo content on dry weight basis. Below this catalyst is termed "Catalyst A".

Catalyst A was characterized by Hg porosimetry. 17% of the pore volume was associated with pores having a diameter of 50 nm or more (macropores).

100 ml of Catalyst A was loaded in an isothermal pilot plant reactor. A straight-run fossil diesel spiked with TBDS was used for sulfiding the catalyst.

As feedstock a 15% by volume rapeseed oil mixed with 85% by volume straight run fossil LGO was mixed with hydrogen gas and passed over Catalyst A. The test was carried out at a pressure of 30 barg, a temperature of 320° C., a liquid hourly space velocity of 1.5 h$^{-1}$, and a H$_2$/oil ratio of 250 Nm$^3$/m$^3$. The properties of feed and liquid product are listed in Table 1.

TABLE 1

Properties of liquid feed and product in example 1

| Property | Feedstock | Product |
|---|---|---|
| S.G. (ASTM D4052) | 0.864 | 0.845 |
| S (wt %) (ASTM D4294) | 1.05 | 0.98 |
| N (wtppm) (ASTM D4629) | 159 | 121 |
| H (wt %) (ASTM D4808) | 12.9 | 13.3 |
| Mono Aromatics (wt %) (IP 391) | 13.3 | 13.8 |
| Poly Aromatics (wt %) (IP 391) | 10.3 | 9.9 |
| Simulated Distillation (° C.) (ASTM D2887) | | |
| 5 wt % | 234 | 233 |
| 10 wt % | 253 | 255 |
| 30 wt % | 286 | 287 |
| 50 wt % | 318 | 315 |
| 70 wt % | 358 | 339 |
| 90 wt % | 508 | 377 |
| 95 wt % | 601 | 393 |

The complete conversion of rapeseed oil at these conditions is evidenced by the removal of all material (triglycerides) boiling above 405° C., as the 95 wt % distillation point of the fossil LGO is 405° C. Furthermore, the yield of propane was measured to be 0.65 wt % based on fresh feed, consistent with total conversion of the triglycerides and 1 mole of propane formed for each mole of triglyceride converted.

The relatively low HDS, HDN and HDA activity of Catalyst A means that even though all rapeseed oil is converted into hydrocarbons, the conversion of sulfur and nitrogen species is very low at these conditions. The total aromatics content is unchanged, only a slight conversion of polyaromatics into monoaromatics was observed.

This example demonstrates the ability of Catalyst A to achieve 100% conversion of triglycerides at typical hydrotreating conditions with very little reduction in sulfur, nitrogen and aromatics content. Thus, this example proves that although the HDO reaction resembles HDS since in both reactions a heteroatom is hydrogenated and taken out of the molecule, the HDO catalyst of the invention only containing Mo is unexpectedly active in the conversion of triglycerides despite being inactive in HDS, HDN, HDA.

EXAMPLE 2

Comparative

The feedstock from example 1 (15 vol % Rapeseed oil/85 vol % LGO) is processed over Catalyst B (traditional high-activity Ni—Mo/alumina). The test was carried out at a pressure of 30 barg, a temperature of 340° C., a liquid hourly space velocity of 0.95 h$^{-1}$, and a H$_2$/oil ratio of 260 Nm$^3$/m$^3$. The properties of feed and liquid product are listed in Table 2.

TABLE 2

Properties of liquid feed and product in example 2

| Property | Feedstock | Product |
|---|---|---|
| S.G. (ASTM D4052) | 0.864 | 0.845 |
| S (wt %) (ASTM D4294/ASTM D5453) | 1.05 | 0.036 |
| N (wtppm) (ASTM D4629) | 159 | 30 |
| H (wt %) (ASTM D4808) | 12.9 | 13.7 |
| Mono Aromatics (wt %) (IP 391) | 13.3 | 20.7 |
| Poly Aromatics (wt %) (IP 391) | 10.3 | 3.5 |
| Simulated Distillation (° C.) (ASTM D2887) | | |
| 5 wt % | 234 | 224 |
| 10 wt % | 253 | 249 |
| 30 wt % | 286 | 284 |
| 50 wt % | 318 | 307 |
| 70 wt % | 358 | 336 |
| 90 wt % | 508 | 378 |
| 95 wt % | 601 | 398 |

Similar to Example 1, the distillation curve shows that all rapeseed oil is converted into hydrocarbons. This is corroborated with an observed yield of propane of 0.61 wt % based on fresh feed, which is within experimental uncertainty of the result in Example 1.

In contrast to Example 1 a much higher conversion of sulfur and nitrogen containing molecules is observed. Furthermore, the conversion of polyaromatics to monoaromatics is much higher than in Example 1. Even when taking the slightly different reaction conditions into account, the degree of HDS, HDN and saturation of polyaromatics is as expected higher when using a high-activity Ni—Mo catalyst than when using Catalyst A.

This example thus demonstrates that when using a traditional high-activity promoted hydrotreating catalyst at typical hydrotreating conditions the complete conversion of triglycerides will be associated with a high conversion of sulfur and aromatics.

The low activity of Catalyst A for these reactions results in lower chemical hydrogen consumption as demonstrated by the lower hydrogen content of the product in Example 1 compared to the product in Example 2. When using an adiabatic reactor, the temperature rise due to the exothermic HDS, HDN and HDA reactions is significantly lower when using Catalyst A prepared in accordance with this invention than when using a conventional high-activity promoted hydrotreating catalyst. As a consequence, the propensity to form coke due to high temperatures and a low local hydrogen partial pressure in the catalyst pellets is lowered.

EXAMPLE 3

A feedstock consisting of 25 vol % FAME (biodiesel) derived from tall oil and 75% light fossil LGO was mixed with hydrogen and fed to a isothermal pilot plant reactor loaded with a combination of catalyst A and a high-activity conventional Ni—Mo/alumina hydrotreating catalyst (catalyst C). Catalyst A was loaded in the top 20 vol % of the catalyst bed and Catalyst C was loaded in the bottom 80 vol % of the catalyst bed. The test was carried out at a pressure of barg, a temperature of 340° C., a total liquid hourly space velocity of 1.2 $h^{-1}$, and a $H_2$/oil ratio of 260 $Nm^3/m^3$. The properties of feed and liquid product are listed in Table 3.

TABLE 3

Properties of liquid feed and product in example 3

| Property | Feedstock | Product |
| --- | --- | --- |
| S.G. (ASTM D4052) | 0.843 | 0.816 |
| S (wt %) (ASTM D5453) | 480 | 3 |
| N (wtppm) (ASTM D4629) | 7 | <0.1 |
| H (wt %) (ASTM D4808) | 13.0 | 14.1 |
| Mono Aromatics (wt %) (IP 391) | 11.5 | 13.7 |
| Poly Aromatics (wt %) (IP 391) | 4.3 | 0.5 |
| Simulated Distillation (° C.) (ASTM D2887) | | |
| 5 wt % | 184 | 178 |
| 10 wt % | 198 | 195 |
| 30 wt % | 224 | 221 |
| 50 wt % | 242 | 238 |
| 70 wt % | 265 | 261 |
| 90 wt % | 354 | 317 |
| 95 wt % | 355 | 318 |

The light fossil LGO that constitutes 75% of the feedstock has a final boiling point of approximately 290° C., and when the product distillation has higher boiling components this is due to the formation of primarily n-$C_{18}$, and small fractions of n-$C_{20}$ and n-$C_{22}$. The yield of methane was 1.2 wt % based on fresh feed, which is consistent with 1 mole of methane formed per mole of FAME converted at 100% FAME conversion, taking into account the ca. 10 wt % content of free fatty acids and resin acids in the feed.

This example demonstrates the combination of a hydrodeoxygenation step to convert the biological component of the feedstock into hydrocarbons over a Mo/alumina catalyst in accordance with the present invention having a low HDS, HDN and HDA activity and a subsequent step with a highly active Ni—Mo desulfurization catalyst to ensure a low content of sulfur, nitrogen and aromatics in the product.

EXAMPLE 4

Catalyst D was prepared by mixing 3 wt % of a commercially available zeolite beta having a specified $SiO_2:Al_2O_3$ molar ratio of 350, with 77 wt % amorphous silica-alumina (high alumina type) and 20 wt % gamma alumina. The resulting mixture was extruded to form $\frac{1}{16}$" extrudates. The extrudates were dried and calcined at 500° C. for 2 hours in air. The calcined extrudates were impregnated with an aqueous solution containing nickel nitrate and ammonium metatungstate. The wet extrudates were dried and calcined at 500° C. for 2 hours in air. The final catalyst contained 6 wt % nickel oxide (NiO) and 22 wt % tungsten oxide ($WO_3$) (all on dry weight basis).

The hydrodeoxygenated product from Example 1 was collected and analyzed by ASTM D5773 showing a cloud point of 7.7° C. and by ASTM D5949 showing a pour point of 2.2° C. This product was used as feedstock in a new pilot plant test with Catalyst D. The test was carried out at a pressure of 60 barg, a temperature of 370° C., a total liquid hourly space velocity of 1.0 $h^{-1}$, and a $H_2$/oil ratio of 300 $Nm^3/m^3$. The other properties of the feed and liquid product are listed in Table 4.

TABLE 4

Properties of liquid feed and product in example 4

| Property | Feedstock | Product |
| --- | --- | --- |
| S.G. (ASTM D4052) | 0.845 | 0.8204 |
| S (wt %) (ASTM D4294/ASTMD5453) | 0.98 | 0.0001 |
| N (wtppm) (ASTM D4629) | 121 | 0.1 |
| H (wt %) (ASTM D4808) | 13.3 | 14.1 |
| Mono Aromatics (wt %) (IP 391) | 13.8 | 14.8 |
| Poly Aromatics (wt %) (IP 391) | 9.9 | 1.6 |
| Simulated Distillation (° C.) (ASTM D2887) | | |
| 5 wt % | 233 | 158 |
| 10 wt % | 255 | 199 |
| 30 wt % | 287 | 267 |
| 50 wt % | 315 | 297 |
| 70 wt % | 339 | 318 |
| 90 wt % | 377 | 367 |
| 95 wt % | 393 | 381 |

The product was also analyzed by D5773 showing a cloud point of 1.5° C. and by ASTM D5949 showing a pour point of −6.0° C. This means that the cloud point is lowered by 6.2° C. from feed to product and the pour point is reduced by 8.2° C. from feed to product.

This example demonstrates the ability of hydroisomerization catalyst D to substantially lower cloud and pour points even when processing a high-sulfur feed, meaning that the catalyst of the present invention is also active when used for cold flow improvement in an $H_2S$ atmosphere.

The invention claimed is:
1. Process for production of a hydrocarbon fuel from renewable organic material of biological origin comprising the steps:
  (a) forming a feedstock by combining a fossil hydrocarbon fuel with a renewable organic material wherein the content of renewable organic material material is 1 to 35 vol %; and
  (b) mixing the feedstock of step (a) with a hydrogen-rich gas and conducting the combined stream to a hydrodeoxygenation stage by contacting said combined stream with a hydrodeoxygenation catalyst,
  wherein the hydrodeoxygenation catalyst is a supported unpromoted Mo catalyst having Mo content of 0.1 to 20 wt %, the support being selected from alumina, silica, titania and combinations thereof, and said support hav- ing a bimodal porous structure with pores with a diameter larger than 50 nm that constitute at least 2 vol % of the total pore volume.

2. Process according to claim 1, wherein the hydrogen-rich gas is a hydrogen-recycle gas stream, a hydrogen make-up gas or a combination of both.

3. Process according to claim 1, wherein the hydrodeoxygenation catalyst of step (b) is Mo supported on alumina.

4. Process according to claim 1, further comprising:
(c) passing the effluent stream from step (b) to a hydrotreating stage by contacting said stream with a hydrotreating catalyst.

5. Process according to claim 1, further comprising:
(d) passing the effluent stream from step (b) or (c) to a hydroisomerization stage by contacting said stream with a hydroisomerization catalyst.

6. Process according to claim 1, wherein the renewable organic material is selected from triglycerides, fatty acids, resin acids, fatty acid esters or combinations thereof.

7. Process according to claim 1, wherein the hydrodeoxygenation step (b) is carried out at a hydrogen pressure of 1-200 bar, at a temperature of 50-350° C., and at a liquid hourly space velocity of 0.1-10 $h^{-1}$.

8. Process according to claim 1, further comprising separating the effluent from any of the steps (b), (c) and (d) into a liquid effluent stream and a gaseous effluent stream, mixing said liquid effluent stream with a fresh hydrogen-rich gas, forming a purified hydrogen containing gas stream by removing H2S, NH3, CO, CO2 and light hydrocarbons from said gaseous effluent, and recycling said purified hydrogen containing gas to any of the steps (b), (c) and (d).

9. Process according to claim 1, wherein steps (b), (c) and (d) are carried out in the same hydroprocessing reactor or in separate hydroprocessing reactors.

10. Process according to claim 4, wherein the hydrotreating catalyst of step (c) comprises a metal component selected from Group VIII and/or VI of the Periodic System and being supported on a carrier containing alumina, silica, titania or combinations thereof.

11. Process according to claim 5, wherein the hydroisomerization treating catalyst of step (d) comprises a metal component selected from Group VIII and/or VI of the Periodic System and being supported on a carrier containing alumina, silica, titania, silica-alumina, ZSM-5, zeolite beta or combinations thereof.

12. Process according to claim 5, wherein the hydrotreating step (c) and hydroisomerization step (d) are carried out at a hydrogen pressure of 1-200 bar and at a temperature of 50-450° C., and at a liquid hourly space velocity of 0.1-10 $h^{-1}$.

13. A hydrodeoxygenation catalyst in the form of a supported unpromoted Mo catalyst having Mo content of 0.1 to 20 wt %, the support being selected from alumina, silica, titania, and combinations thereof, and said support having a bimodal porous structure with pores with a diameter larger than 50 nm that constitute at least 2 vol % of the total pore volume, for the treatment of feedstocks combining a fossil hydrocarbon fuel with a renewable organic material wherein the content of renewable organic material material is 1 to 35 vol %.

* * * * *